US006557429B1

(12) United States Patent
Asquith

(10) Patent No.: US 6,557,429 B1
(45) Date of Patent: May 6, 2003

(54) METHOD OF USING MAGNETIC LIFTING DEVICES

(75) Inventor: Ian Asquith, Sheffield (GB)

(73) Assignee: Eclipse Magnetics Limited, Sheffield (DE)

( * ) Notice: Subject to any disclaimer, the term of this patent is extended or adjusted under 35 U.S.C. 154(b) by 126 days.

(21) Appl. No.: 09/638,908

(22) Filed: Aug. 15, 2000

(30) Foreign Application Priority Data

Feb. 4, 2000 (GB) ............................................ 0002654

(51) Int. Cl.[7] ........................ G01D 21/00; G01N 19/00; H01F 3/14

(52) U.S. Cl. ........................ 73/865; 335/212; 335/236; 335/285; 335/289; 335/291

(58) Field of Search ................................ 335/209, 212, 335/236, 237, 285–301, 302, 306; 294/65.5, 88; 361/133, 143, 144, 147, 159; 119/14.28; 192/3.56, 222; 198/690.1; 414/606; 269/8; 73/865.9

(56) References Cited

U.S. PATENT DOCUMENTS

| | | | | |
|---|---|---|---|---|
| 2,275,839 A | * | 3/1942 | Boehne | 335/220 |
| 3,139,564 A | * | 6/1964 | Sevald | 317/171 |
| 3,763,453 A | * | 10/1973 | Schurr | 294/65.5 |
| 4,237,455 A | | 12/1980 | Beckley et al. | |
| 4,509,377 A | * | 4/1985 | Mentzell et al. | 73/862.56 |
| 4,643,031 A | * | 2/1987 | Mentzell | 73/862.56 |
| 5,748,062 A | * | 5/1998 | Kirkpatrick | 294/65.5 |

OTHER PUBLICATIONS

Test Method for Determining Breakaway Force of a Magnet [online]. Magnet Distributors Fabricators Association, 1997 [retrieved on Mar. 1, 2002]. Retrieved from the Internet: <http://www.mdfa.org/techpublications.htm>.*

Equipment and Procedure for On–Site Inspection of Magnetic Separators [online]. Magnet Distributors Fabricators Association, 1997 [retrieved on Mar. 1, 2002]. Retrieved from the Internet: <http://www.mdfa.org/techpublications.htm>.*

Maglev Technology—Teacher's Handbook—Activities on Electromagnetism and Magnetism [online], Argonne National Laboratory, copyright 1994 [retrieved on Aug. 6, 2002], Retrieved from the Internet <http://act.enc.k12.il.us/maglev.htm>.*

Test Method for Determining Breakaway Force of a Magnet [online]. Magnetic Distributors Fabricators Association, 1997 [retrieved on Mar. 1, 2002]. Retrieved from the Internet:<http://www.mdfa.org/techpublications.htm>.*

Experiments with Magnets and Our Surroundings—What do Magnetic Fields Look Like? [online] Robert Hoadley, copyright 1998–2001 [retrieved on Aug. 6, 2002], retrieved from the Internet <http://my.execpc.com~rhoadley/magindex.htm>.*

* cited by examiner

*Primary Examiner*—Daniel S. Larkin
*Assistant Examiner*—David Rogers
(74) *Attorney, Agent, or Firm*—Oliff & Berridge, PLC

(57) ABSTRACT

A method of testing whether a magnetic lifting device may safely lift a particular load where the magnetic lifting device is placed adjacent to the load, some or all of the magnetic elements of the magnetic lifting device are spaced such that the lifting ability of the magnetic lifting device is reduced by a predetermined amount. An attempt is then made to lift the load by a small safe distance. If this attempt is successful, the user can be sure use of the magnetic lifting device, when the lifting ability is restored, is safe. Conveniently, the spacing is achieved by the introduction of a substantially planar member between the magnetic lifting device and the load. The planar member has a similar footprint to that of the magnetic lifting device. The planar member may be made of stainless steel. A magnetic lifting device may incorporate magnetic elements which may be spaced such that the lifting ability of the magnetic lifting device is reduced by a predictable amount, for example it may incorporate a moveable planar member.

7 Claims, 1 Drawing Sheet

METHOD OF USING MAGNETIC LIFTING DEVICES

FIELD OF THE INVENTION

The present invention relates to the use of magnetic lifting devices, in particular the safety of their use.

BACKGROUND OF THE INVENTION

Magnetic lifting devices may use either permanent magnets or electromagnets, or some combination of the two, to attach themselves to loads made of ferromagnetic materials. If the attraction between the lifting device and the load is sufficiently strong, the load may be raised from the ground and moved supported upon the magnetic lifting device. Such a method of moving loads is often much more convenient than alternative moving means, such as attaching chains around the device, since the magnetic lifting device may be applied and removed so quickly.

A particular magnetic lifting device will have a maximum weight that it is able to lift, before the weight exceeds the attractive force of the magnets. It is usual to give a 'safe working load' for a such a lifting device of a third of the maximum weight. This measure is designed to ensure that a load of a given weight will always be securely held. The weight of a particular load may not be known, and in order to weigh the load, you have to lift it. A load near to the safe lifting weight may be unstably held, and fall from the magnetic lifting device whilst it is being held aloft. Since a large lifting device may have a safe working load of 2 tones (4400 lbs.), it will be appreciated that that such an occurrence would be very dangerous.

Even if the weight of the load is known, there may be further problems. The attractive force between the magnets and the load is proportional to the amount of flux from the magnet which flows through the load. This in turn depends upon the characteristics of the load. Ideally, the load should have a clean flat surface upon which the magnetic lifting device may be placed so that there is no gap between the working surface of the magnetic lifting device and load, since some of the flux will located in this gap, diminishing the amount of flux usefully passing through the load.

Some users of magnetic lifting device resort to expedients such as pressing or banging on loads to test whether they are securely held. Such techniques have obvious drawbacks, and many potential users of magnetic lifting devices prefer to use lifting means such as chains.

The object of the present invention is to reduce the risk that loads may unexpectedly fall from a magnetic lifting device.

SUMMARY OF THE INVENTION

According to the present invention there is provided a method of testing whether a magnetic lifting device may safely lift a particular load comprising the steps of:

placing the magnetic lifting device adjacent to the load;

spacing some or all of the magnetic elements of the magnetic lifting device such that the lifting ability of the magnetic lifting device is reduced by a predetermined amount; and attempting to lift the load by a small safe distance.

The use of the term magnetic elements of the magnetic lifting device are intended to include the magnets themselves and any pole extensions or the like of the lifting device.

Preferably the lifting amount is reduced by the introduction of a substantially planar member between the magnetic lifting device and the load. The planar member may have a similar footprint to that of the magnetic lifting device, and may be made of stainless steel.

According to another aspect of the present invention there is provided a magnetic lifting device whose magnetic elements may be spaced such that the lifting ability of the magnetic lifting device is reduced by a predictable amount.

The introduction of a shim, or other method of reducing the lifting capability of the magnetic lifting device, means that if the magnetic lifting device can lift any load under these conditions, then without such a reduction the magnetic lifting device will be able to lift the same load with a safety factor of at least the same amount as the reduction of the lifting capability of the magnetic lifting device. For example, if a shim is inserted between the magnetic lifting device and the load which reduces the lifting capability of the lifting device by a factor of three (that is, to a third of its normal capability), and the magnetic lifting device succeeds in lifting the load, then the lifting device will lift the same load without the shim with a safety factor of three.

Thus to establishing whether it is safe to use a magnetic lifting device for a particular load comprises a simple testing procedure. Knowledge of parameters which may affect the force of attraction between the load and the magnetic lifting device on the one hand—such as the evenness of the surface, the permeability of the material, the thickness of the material, the presence of cavities in the load, and whether the surface is covered with some amount of paint or rust—and the weight of the load on the other hand, becomes unnecessary.

BRIEF DESCRIPTION OF THE DRAWINGS

A magnetic lifting device and method of using it embodying the invention will now be described, this description being given as an example and not intended to be limiting, with reference to the drawings, of which.

DESCRIPTION OF THE PREFERRED EMBODIMENT

Figure 1:
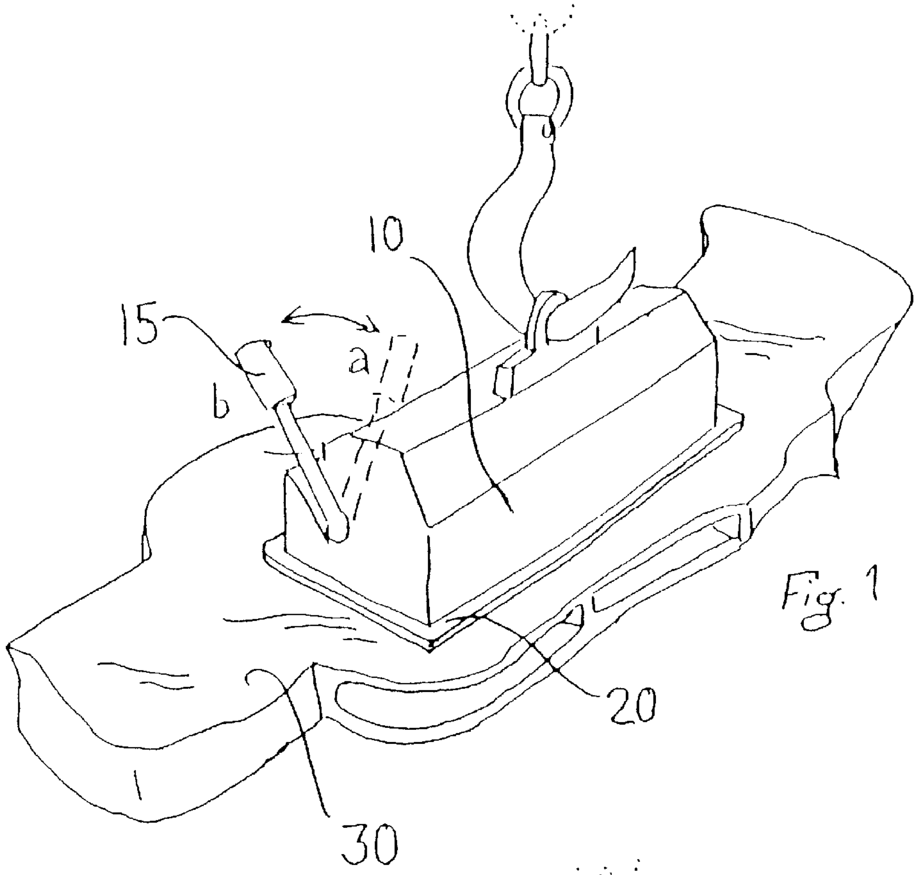
FIG. 1 shows the magnetic lifting device and shim in use.

The magnetic lifting device 10, switched to its 'off' state (with lever 15 in position 'a' in the drawing), is placed in the position in which it is intended to place it when actually lifting the load 30. A shim 20, comprising a substantially rectangular piece of stainless steel plate having a similar footprint to that of the working surface of the magnetic lifting device 10, is placed between the magnetic lifting device 10 and the load 30.

The magnetic lifting device is then switched on, lever 15 being adjusted to position 'b'. The shim 20 closely abuts against the working surface of the magnetic lifting device 10, and a known amount of flux passes through the shim. The total flux available to the load 30, and so that force by which the load is held, is reduced to a third.

With the shim 20 still in place between the magnetic lifting device 10 and the load 30, the magnetic device is lifted a small distance which will depend on the size and shape of the load , but should be sufficient for the load to be completely off the ground, but within a safe margin if the load were to drop from the magnetic lifting device. Typically this distance will be in the order of 10 mm.

Figure 2:
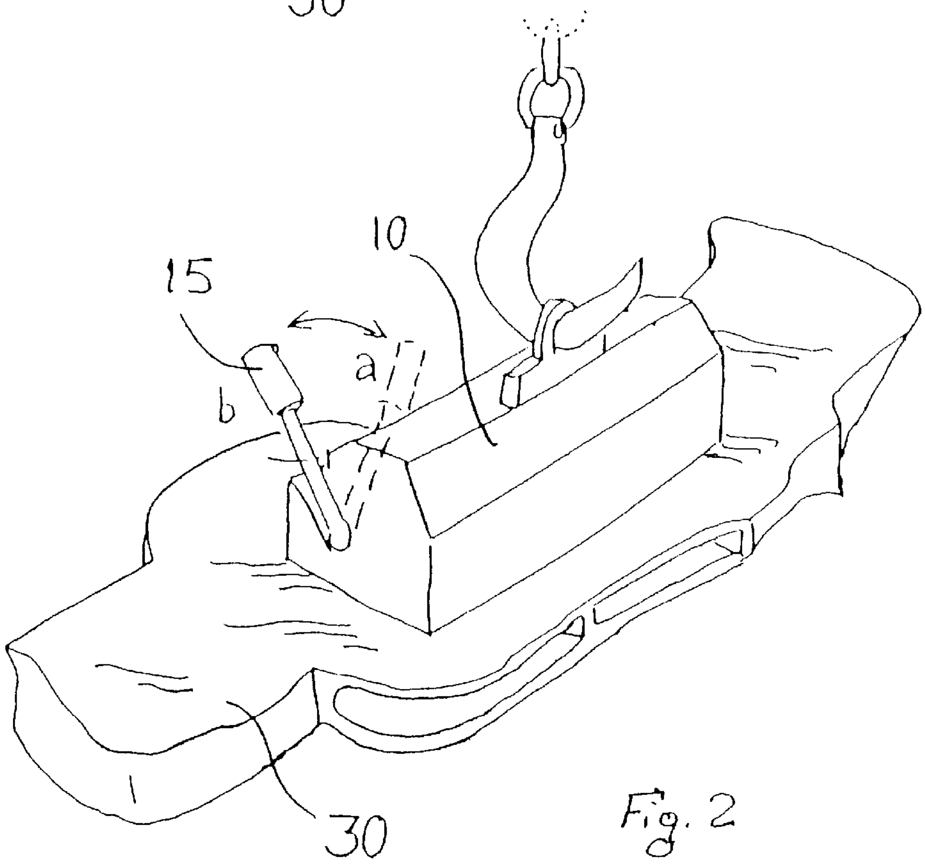
FIG. 2 shows the magnetic lifting device in use.

If the magnetic lifting device 10 lifts the load 30 with the shim 20 in place, the user of the magnetic lifting device can be certain that in normal use of the magnetic lifting device with that particular load, shown in FIG. 2, is equivalent to an ideal load under the safe working load limit, that is, a load one third of the maximum possible load.

If the magnetic lifting device 10 will not lift the load with the shim 20 in place, or if the load is held unstably, the load exceeds or is equal to the safe working load limit. In these circumstances, the magnetic lifting device should not be used with that load, and a larger magnetic lifting device or a pair of magnetic lifting devices should be retested using the same procedure.

It will be appreciated that the shim may take many forms, so long as it reduces the lifting capability of the magnetic lifting device by a predictable amount. The shim may therefore by made of either a highly magnetically permeable material (which, provided it is sufficiently thick, will divert a portion of the flux, in the manner of a keeper), or a material with a low magnetic permeability, such as stainless steel (which will reduce the flux from the magnet to the load), or a non-ferrous materials such as aluminum or brass. The shim should though be non-compressible.

The shim may include a printed or marked legend to identify it uniquely with a particular magnetic lifting device. The similarity of the footprints of the magnetic lifting device and the shim should avoid the wrong shim being used with a particular magnetic lifting device. This will only be dangerous if the shim for one lifting device is used with a higher capability lifting device. Since the footprint of the higher capability lifting device will typically be larger than those of the lower capability lifting device and shim, this is unlikely to occur.

Naturally, the factor by which the shim reduces the lifting capability of the magnetic lifting device need not be a third, but would depend upon what safety factor is chosen for a particular magnetic lifting device.

Rather than being a loose item, the shim could be incorporated into a magnetic lifting device, for example mounted externally upon pivoting arms or a hinge so that it may swing into and out of position. Other means may be employed to predictably reduce the lifting capability of the magnetic lifting device, for example by having a state in which the lifting device's magnets are only switched so as to exert a third of their lifting capability, or by raising the magnets internally so that a gap is introduced for example, between the magnets and the working surface.

Alternative embodiments using the principles disclosed will suggest themselves to those skilled in the art, and it is intended that such alternatives are included within the scope of the invention, the scope of the invention being limited only by the claims.

What is claimed is:

1. A method of testing whether a magnetic lifting device may safely lift a particular load comprising the steps of:

placing the magnetic lifting device adjacent to the load;

spacing some or all of the magnetic elements of the magnetic lifting device from the load with a substantially planar member such that the lifting ability of the magnetic lifting device is reduced by a predetermined amount;

attempting to lift the load a small, safe distance;

upon successful lifting of the load a small, safe distance, subsequently removing the planar member from the magnetic lifting device, and having removed the planar member, placing the magnetic lifting device adjacent to the load and lifting the load as needed.

2. A method according to claim 1 wherein the spacing is achieved by the introduction of a substantially planar member between the magnetic lifting device and the load.

3. A method according to claim 2 wherein the planar member has a similar footprint to that of the magnetic lifting device.

4. A method according to claim 2 wherein the planar member is made of stainless steel.

5. A magnetic lifting device for use in a method according to claim 1, wherein the substantially planar member is mounted in a moveable way such that the magnetic elements may be spaced to reversibly reduce the lifting ability of the magnetic lifting device by a predictable amount.

6. A magnetic lifting device for use in a method according to claim 1, wherein the lifting device's magnetic elements may be switched so as to exert a proportion of their lifting capability such that the lifting ability of the magnetic lifting device is reversibly reduced by a predictable amount.

7. A magnetic lifting device for use in a method according to claim 1, wherein the magnetic elements may be raised internally to introduce a gap between the magnet elements and a working surface so as to reversibly reduce the lifting ability of the magnetic lifting device by a predictable amount.

* * * * *